June 12, 1956  L. SABATO  2,750,206
BICYCLE TRAILER
Filed Oct. 27, 1953  2 Sheets-Sheet 1

Louis Sabato
INVENTOR.

June 12, 1956 L. SABATO 2,750,206
BICYCLE TRAILER
Filed Oct. 27, 1953 2 Sheets-Sheet 2
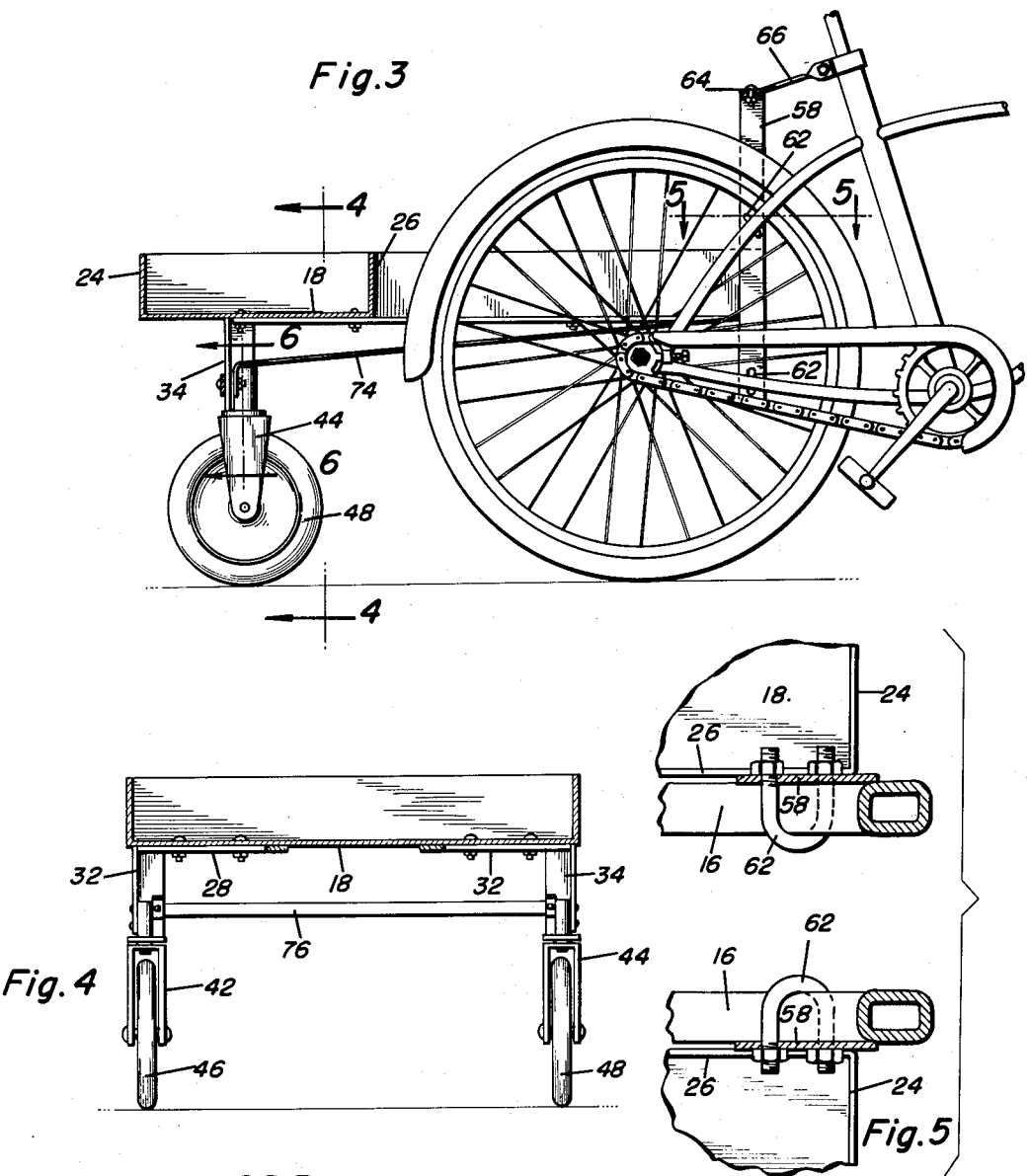
Louis Sabato
INVENTOR.

United States Patent Office 2,750,206
Patented June 12, 1956

2,750,206

BICYCLE TRAILER

Louis Sabato, Philadelphia, Pa.

Application October 27, 1953, Serial No. 388,644

1 Claim. (Cl. 280—204)

This invention relates to the class of land vehicles, and more particularly to a trailer for use as an attachment for a bicycle or like vehicle.

The primary object of this invention resides in the provision of a trailer adapted to be secured to a bicycle and to be towed therebehind, the trailer being capable of supporting considerable weight without affecting the balance or safety of the rider of the bicycle.

It has been found that the stability of a bicycle is greatly decreased by towing a trailer therebehind at any distance. The concept of the present invention resides in the provision of a substantially U-shaped platform which embraces the rear wheel of a bicycle. Means including a U-shaped harness are adapted to support the trailer in such manner as to actually increase the stability of the bicycle rather than adversely affect such stability. Further incorporated in this trailer are enlarged casters or wheels which are swivelly mounted below the carrying platform of the trailer so as to permit freedom of movement of the trailer whereby the trailer can be more responsible to the direction taken by the bicycle.

An additional advantage of this invention resides in the novel means for securing the trailer to a bicycle which includes means for reinforcing and rigidifying the entire structural assembly of the trailer even though it is recessed for reception of the rear wheel.

Still further objects of this invention reside in the provision of a bicycle trailer that is strong and durable, simple in construction and manufacture, capable of being readily produced inexpensively out of various readily available materials, and which is highly attractive in appearance.

These, together with the various ancillary objects and features of the invention which will become apparent as the following description proceeds, are attained by this bicycle trailer, a preferred embodiment of which has been illustrated in the accompanying drawings, by way of example only, wherein:

Figure 3 is a vertical sectional view as taken along the plane of line 3—3 in Figure 1:

Figure 4 is a vertical sectional view as taken along the plane of line 4—4 in Figure 3;

Figure 5 is an enlarged horizontal sectional detail view as taken along the plane of line 5—5 in Figure 3 illustrating means utilized in securing the trailer attachment to a bicycle; and Figure 6 is a sectional detail view illustrating one type of swivel mounting for the casters or wheels of the trailer.

Figure 1:
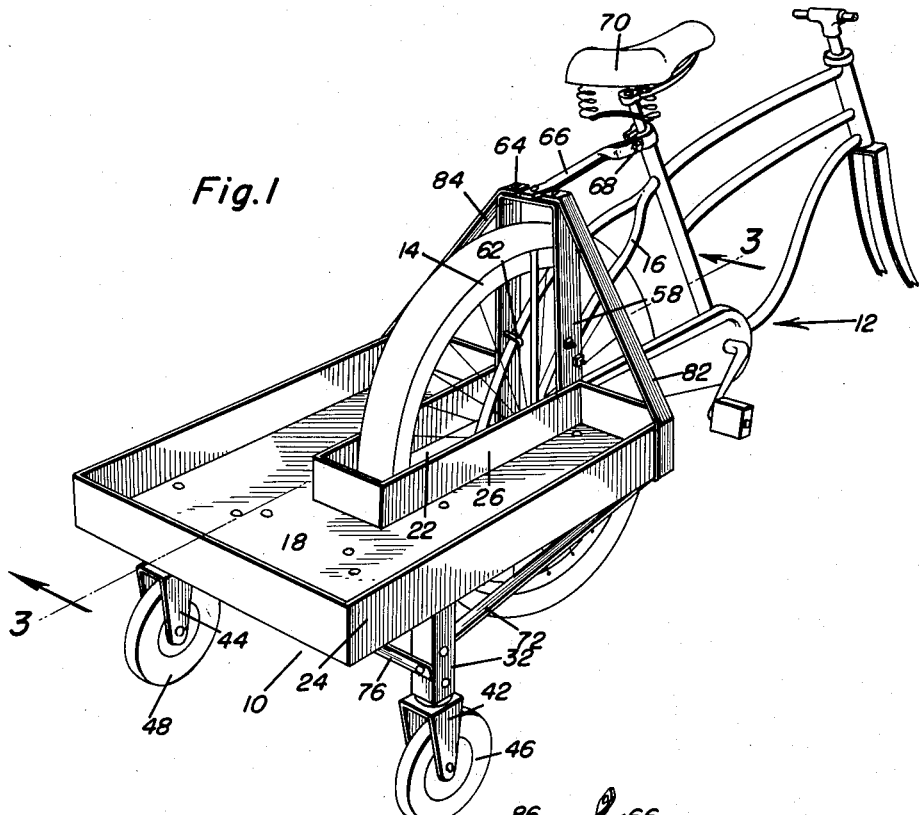
Figure 1 is a perspective view of the bicycle trailer comprising the present invention as being operatively attached to a bicycle.
Figure 2:
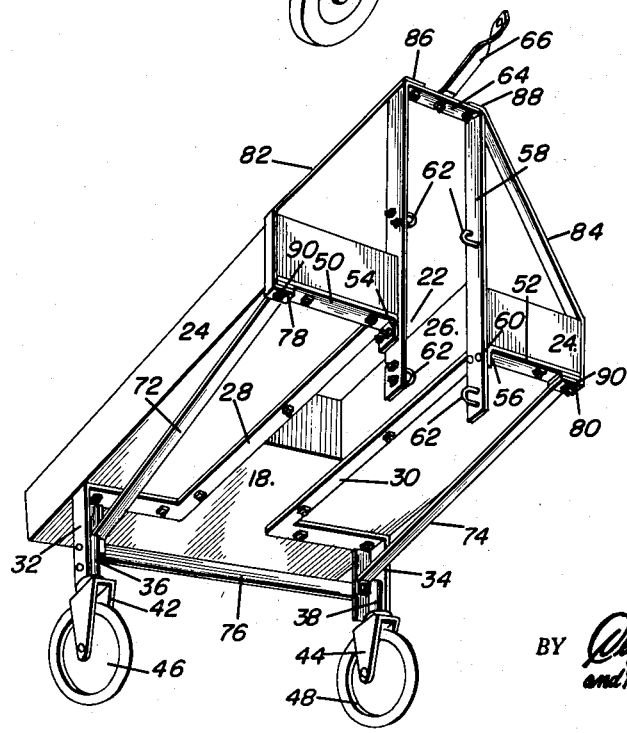
Figure 2 is a perspective view of the trailer attachment.

With continuing reference to the accompanying drawings wherein like reference numerals designate similar parts throughout the various views, reference numeral 10 generally designates the trailer attachment for a bicycle 12 having a rear wheel 14 supported by a conventional frame 16.

The trailer attachment 10 includes a load carrying platform 18 having a substantially U-shaped recess 22 in the forward portion thereof forming the platform 18 into a substantial U-shape. Welded or otherwise attached to the peripheral edges of the platform 18 is a flange 24. A substantially U-shaped flange 26 cooperates with the flange 24 to provide a complete enclosure for the platform 18, the U-shaped flange 26 being secured to the platform 18 about the edges of the recess 22.

Attached to the underside of the platform 18 are a pair of substantially L-shaped members 28 and 30 which aid in rigidifying the trailer and which have at their rearmost and outermost ends substantially L-shaped channel members 32 and 34 which extend downwardly therefrom and which carry sockets 36 and 38 within which the rotatable shafts, as at 40, of yokes 42 and 44 providing the swivel mountings for wheels 46 and 48 are seated. The yokes 42 and 44 are, of course, swivelly mounted by bearings 49 or the like relative to the shafts 40.

Attached to the forward portion of the underside of the platform 18 are a pair of L-shaped support brackets 50 and 52 which overlie the L-shaped members 28 and 30 and which have downwardly depending portions 54 and 56 to which a substantially U-shaped harness 58 is attached by suitable fasteners, as at 60. U-bolts, as at 62, are attached to the spaced legs of the harness 58 and are adapted to attach the harness 58 and hence the trailer 10 to the frame 16 of the bicycle both above and below the platform 18. The upper cross-member 64 of the harness 58 has attached thereto a strap 66 which is secured by the bolt 68 utilized for adjusting the seat 70 of the bicycle 12. The strap 66 therefore provides means for securing the upper portion of the harness 58 and hence the trailer 10 to the upper portions of the bicycle thereby stabilizing the trailer 10 and providing a closer union between the bicycle 12 and the trailer 10. Further, utilization of the bolt 68 which is already a part of the bicycle eliminates the necessity for the provision of any additional special fastener at this point.

Underlying the L-shaped brackets 50 and 52 are slantingly extending braces 72 and 74 which are secured to the supporting members 32 and 34 for the wheels 46 and 48 to rigidify these downwardly extending supporting structures 32 and 34. A transverse brace 76 extends between the support members 32 and 34.

Underlying the slantingly extending braces 72 and 74 are the inwardly extending portions 78 and 80 of a pair of frontal brackets 82 and 84 which lie against the forward portions of the flanges 24 and then extend upwardly and convergingly and have upper inwardly extending portions 86 and 88 bolted or otherwise secured to the cross-member 64. It is noted that the fasteners, as at 90, utilized in securing the frontal brackets 82 and 84 also secure the braces 72 and 74 and the L-shaped brackets 50 and 52 to the platform 18.

As can be readily understood from an inspection of the drawings, the bicycle trailer is so arranged as to support the weight of the trailer directly over the axle of the rear wheel 14, thus, in effect, increasing the stability of the bicycle. Further, since the trailer is so rigidly connected to the frame 16 at a plurality of points as by the U-bolt 62 and the strap 66, no erratic motions of the trailer 10 relative to the bicycle are possible.

It is noted that the trailer may be constructed from steel, scrap metal, or any other suitable substance as may be desired and may be painted or finished in any suitable manner.

Since from the foregoing, the construction and advantages of this bicycle trailer are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to.

What is claimed as new is as follows:

A trailer for a bicycle comprising a substantially U-shaped platform having a recess in the front portion thereof, said platform having a peripheral upwardly extending flange and a substantially U-shaped upwardly extending flange extending about the periphery of said recess, an inverted U-shaped harness secured against said U-shaped flange, said harness including a pair of spaced legs interconnected by an upper cross-member, said harness being in alignment with said recess, a strap attached to said upper cross-member for securing said trailer to the upper part of a frame of a bicycle, fasteners secured to said legs above and below said platform for securing said trailer to lower parts of the frame of a bicycle on each side of the rear wheel of the bicycle with the rear wheel extending into said recess, vertically extending wheel supports at the rear of said platform, wheels swivelly and rotatably carried by said wheel supports, a pair of L-shaped support brackets secured to the underside of said platform, each of said L-shaped support brackets having a downwardly depending portion fastened to said harness, slantingly extending braces secured under said L-shaped support brackets to said platform and to said wheel supports, and frontal rigidifying brackets having portions thereof underlying said slantingly extending braces and said L-shaped brackets and being secured to said platform, said frontal brackets being further secured to said upper cross-member of said harness.

References Cited in the file of this patent

UNITED STATES PATENTS

| | | |
|---|---|---|
| 1,141,112 | Ewing | June 1, 1915 |
| 1,407,597 | Smith | Feb. 21, 1922 |
| 2,212,958 | Rea | Aug. 27, 1940 |
| 2,385,196 | Diesel | Sept. 18, 1945 |
| 2,495,935 | Kreeger | Jan. 31, 1950 |

FOREIGN PATENTS

| | | |
|---|---|---|
| 416,592 | Italy | Dec. 5, 1946 |
| 431,951 | Italy | Mar. 10, 1948 |
| 193,204 | Switzerland | Dec. 16, 1937 |